(12) United States Patent
Mixter et al.

(10) Patent No.: US 12,341,849 B2
(45) Date of Patent: *Jun. 24, 2025

(54) DISTRIBUTED AMBIENT COMPUTING WITHIN AN ENVIRONMENT

(71) Applicant: Google LLC, Mountain View, CA (US)

(72) Inventors: Kenneth Mixter, Los Altos Hills, CA (US); Ken MacKay, Sunnyvale, CA (US); Byungchul Kim, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,834

(22) Filed: Feb. 27, 2024

(65) Prior Publication Data

US 2024/0205293 A1 Jun. 20, 2024

Related U.S. Application Data

(63) Continuation of application No. 18/001,569, filed as application No. PCT/US2021/039367 on Jun. 28, 2021, now Pat. No. 11,962,650.

(Continued)

(51) Int. Cl.
*H04L 67/12* (2022.01)
*G06F 8/71* (2018.01)
(Continued)

(52) U.S. Cl.
CPC ............... *H04L 67/12* (2013.01); *G06F 8/71* (2013.01); *G06F 21/44* (2013.01); *H04L 67/51* (2022.05)

(58) Field of Classification Search
CPC ..... H04L 67/12; H04L 67/51; H04L 41/0853; H04L 41/0806; H04L 67/1095;
(Continued)

(56) References Cited

U.S. PATENT DOCUMENTS

| 8,984,186 B2 | 3/2015 | Dureau |
| 10,181,978 B1 * | 1/2019 | Argenti .................. H04L 67/12 |

(Continued)

FOREIGN PATENT DOCUMENTS

WO  2022005965  1/2022

OTHER PUBLICATIONS

"International Preliminary Report on Patentability", Application No. PCT/US2021/039367, Dec. 13, 2022, 9 pages.

(Continued)

*Primary Examiner* — Kyung H Shin
(74) *Attorney, Agent, or Firm* — Colby Nipper PLLC

(57) ABSTRACT

Systems and techniques are provided for distributed ambient computing within an environment. A first version of an ambient computing library running on a device may check a manifest in the storage of the device to identify a second device that provides a service. The first version of the ambient computing library may send data to be processed using the service to the second device through a second version of the ambient computing library running on the second device. The first device and the second device may include different computing hardware. The first version of the ambient computing library may receive data including results from the second device through the second version of the ambient computing library. The data including the results may be generated by the second device based on processing the data sent from the device by the first version of the ambient computing library.

22 Claims, 10 Drawing Sheets

Related U.S. Application Data

(60) Provisional application No. 63/045,778, filed on Jun. 29, 2020.

(51) Int. Cl.
*G06F 21/44* (2013.01)
*H04L 67/51* (2022.01)

(58) Field of Classification Search
CPC ... H04L 45/60; G06F 9/48; G06F 9/52; G06F 16/27; G06F 9/5083; H04W 84/18
See application file for complete search history.

(56) References Cited

U.S. PATENT DOCUMENTS

| | | |
|---|---|---|
| 10,448,454 B1 * | 10/2019 | Tao .................. H04L 67/51 |
| 11,272,481 B2 | 3/2022 | Kozura et al. |
| 11,962,650 B2 | 4/2024 | Mixter et al. |
| 2023/0229436 A1 | 7/2023 | Mixter et al. |

OTHER PUBLICATIONS

"International Search Report and Written Opinion", Application No. PCT/US2021/039367, Oct. 25, 2021, 11 pages.
"Non-Final Office Action", U.S. Appl. No. 18/001,569, Aug. 16, 2023, 12 pages.
"Notice of Allowance", U.S. Appl. No. 18/001,569, Dec. 12, 2023, 7 pages.

* cited by examiner

DISTRIBUTED AMBIENT COMPUTING WITHIN AN ENVIRONMENT

RELATED APPLICATIONS

This application is a continuation of and claims priority to U.S. Non-Provisional Application Ser. No. 18/001,569, filed Dec. 12, 2022, which is a national stage entry of International Application No. PCT/US2021/039367, filed Jun. 28, 2021, which claims the benefit of U.S. Provisional Application No. 63/045,778, filed Jun. 29, 2020, the disclosures of which are incorporated herein by reference in their entirety.

BACKGROUND

Devices, including sensors, in an environment, such as a structure, may use the computational resources of a cloud computing system. This may involve data generated by the devices within the environment being transmitted out of the environment to the cloud computing system, requiring that the environment have a network connection that allows data to be sent to the cloud computing system, and making it more difficult to maintain the privacy of the data from devices. The results of any computation performed by the cloud computing system may need to be sent back to the environment, which may involve increased latency when controlling devices in the environment.

BRIEF SUMMARY

According to an embodiment of the disclosed subject matter, a first version of an ambient computing library running on a device may check a manifest in the storage of the device to identify a second device that provides a service. The first version of the ambient computing library running on the device may send data to be processed using the service provided by the second device to the second device through a second version of the ambient computing library running on the second device. The first device and the second device may include different computing hardware. The first version of the ambient computing library running on the device may receive data including results from the second device through the second version of the ambient computing library. The data including the results may be generated by the second device based on processing, with the service provided by the second device using computing hardware of the second device, the data sent from the device by the first version of the ambient computing library.

The first version of the ambient computing library running on the device may determine a leader device for a second service. The second data stored on the device is of a type used by the second service. The first version of the ambient computing library running on the device may send the second data to the leader device for the second service.

The leader device for the second service may be listed in a home directory stored on the device.

The first version of the ambient computing library running on the device may vote in an election for a leader device.

The first version of the ambient computing library running on the device may send an authorization request to a server. The authorization request may include a request by the device to create and offer a third service to other devices in an environment with the device. An updated manifest including a listing of the third service may be received from the server.

The first version of the ambient computing library running on the device from a third version of the ambient computing library running on a third device may receive second data to be processed using the third service provided by the device. The second data may be processed with the third service provided by the device to generate third data including results of processing the second data. The first version of the ambient computing library running on the device may send the third data comprising results to devices in an environment with the device through versions of the ambient computing library on the devices.

The device and the second device may be located in an environment and communicate through a local area network.

According to an embodiment of the disclosed subject matter, a means for checking, by a first version of an ambient computing library running on a device, a manifest in the storage of the device to identify a second device that provides a service, a means for sending, by the first version of the ambient computing library running on the device, data to be processed using the service provided by the second device to the second device through a second version of the ambient computing library running on the second device, wherein the first device and the second device comprise different computing hardware, a means for receiving, by the first version of the ambient computing library running on the device, data including results from the second device through the second version of the ambient computing library, wherein the data including the results is generated by the second device based on processing, with the service provided by the second device using computing hardware of the second device, the data sent from the device by the first version of the ambient computing library, a means for determining, by the first version of the ambient computing library running on the device, a leader device for a second service, wherein second data stored on the device is of a type used by the second service, a means for sending, by the first version of the ambient computing library running on the device, the second data to the leader device for the second service, a means for voting, by the first version of the ambient computing library running on the device, in an election for a leader device, a means for sending, by the first version of the ambient computing library running on the device, an authorization request to a server, the authorization request including a request by the device to create and offer a third service to other devices in an environment with the device, a means for receiving, from the server, an updated manifest including a listing of the third service, a means for receiving, by the first version of the ambient computing library running on the device from a third version of the ambient computing library running on a third device, second data to be processed using the third service provided by the device, a means for processing the second data with the third service provided by the device to generate third data including results of processing the second data, and a means for sending, by the first version of the ambient computing library running on the device, the third data including results to devices in an environment with the device through versions of the ambient computing library on the devices, are provided.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
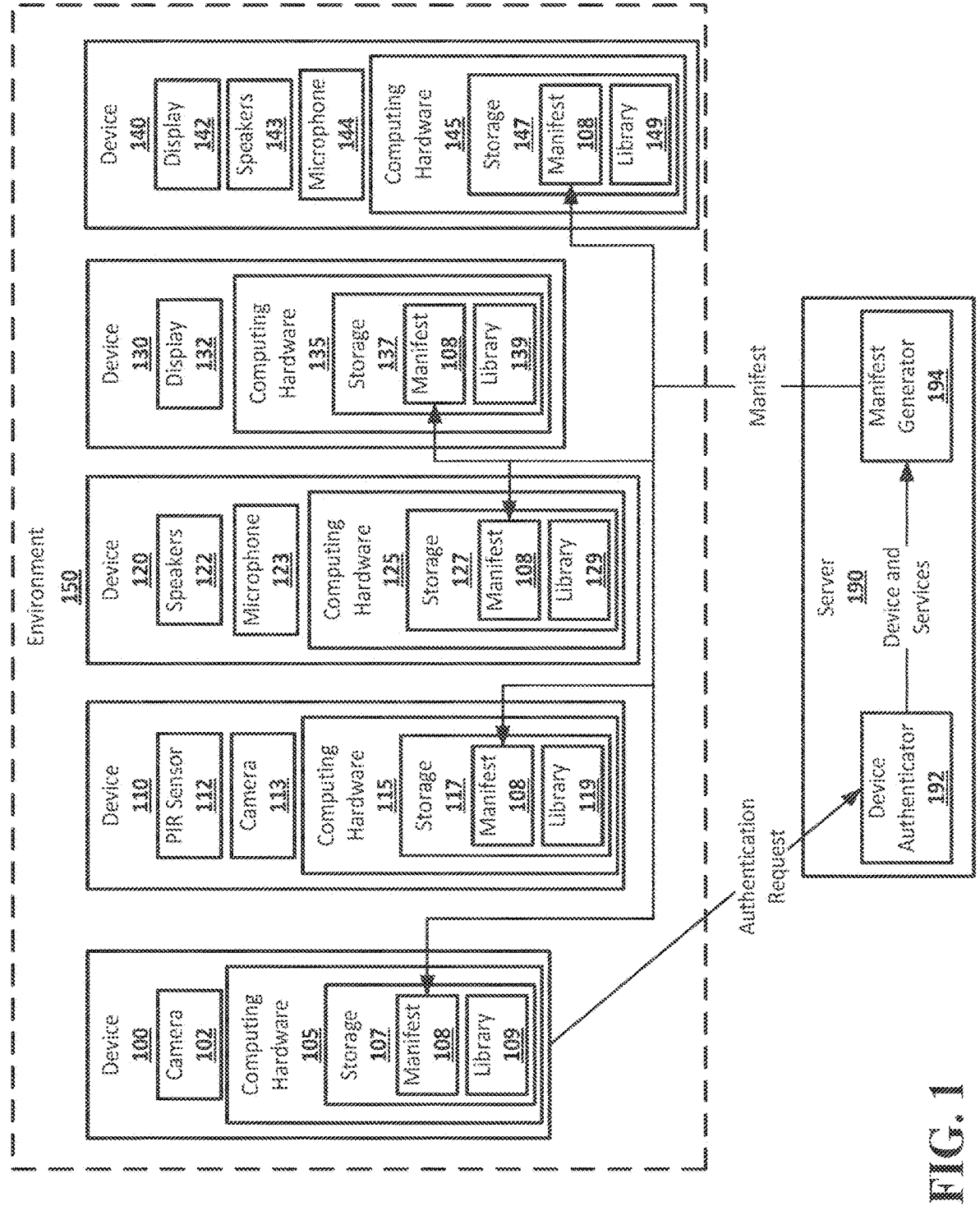
FIG. 1 shows an example system and arrangement suitable for distributed ambient computing within an environment according to an implementation of the disclosed subject matter.

According to embodiments disclosed herein, distributed ambient computing within an environment may allow for devices in an environment to share computational resources and services and perform computation related to automation and control of the environment within the environment. An ambient computing library may be stored on the computing hardware of devices in an environment. The ambient computing library may be customized for the different types of computing hardware of the devices and different operating systems running on that computing hardware. The ambient computing library may allow the devices in the environment to communicate with each other and may be used by the devices to share services offered by the devices and share computational resources of the devices. The ambient computing library may allow for elections to be held among the devices to elect leader devices for services, the determination of when devices have been shut down or removed from the environment, and the introduction of new devices offering new services to the environment. This may allow for computation related to the devices in the environment to be distributed across the devices, keeping data within the environment.

An environment may include a number of devices. The environment may be, for example, a home, office, apartment, or other structure, outdoor space, or combination of indoor and outdoor spaces. Devices in the environment may include, for example, lights, sensors including passive infrared sensors used for motion detection, light sensors, cameras, microphones, entryway sensors, light switches, as well as mobile device scanners that may use Bluetooth, WiFi, RFID, or other wireless devices as sensors to detect the presence of devices such as phones, tablets, laptops, or fobs, security devices, locks, A/V devices such as TVs, receivers, and speakers, devices for HVAC systems such as thermostats, motorized devices such as blinds, and other such controllable devices. The devices may also include general computing devices, such as, for example, phones, tablets, laptops, and desktops. The devices within the environment may include computing hardware, including processors, volatile and non-volatile storage, and communications hardware for wired and wireless network communication, including WiFi, Bluetooth, and any other form of wired or wireless communication. The computing hardware in the various devices in the environment may differ. The various devices may run different operating systems. The devices in the environment may be connected to the same network, which may be any suitable combination of wired and wireless networks, and may involve mesh networking, hub-and-spoke networking, or any other suitable form of network communications.

An ambient computing library may be stored on the computing hardware of the devices in an environment. The ambient computing library may allow for communication between devices and may enable devices to offer services that may be used by the other devices in the environment and enable the sharing of computational resources among the devices. The ambient computing library may be customized for the different types of computing hardware of the devices and different operating systems running on that computing hardware. This may allow the devices in the environment to run versions of the ambient computing library that offer the same functionality, even when the devices are using different operating systems and have different computing hardware. Each version of the ambient computing library may be able to communicate with other versions of the ambient computing library. In some implementations, each version of the ambient computing library may include the same features, such as, for example, procedures that may be run using the ambient computing library. In some implementations, different version of the ambient computing library may have different features from other versions, for example, in order to make some versions of the ambient computing library smaller so that it may be stored on devices with smaller amounts of storage space.

The ambient computing library may allow for elections to be held among the devices in the environment. Elections may be held among the devices in the environment to select devices to act as leaders for various services offered by the devices of the environment. For example, a device may be elected as the leader for determining the occupancy state of the environment based on signals from sensors throughout the environment. Another device may be elected as a leader for controlling audio playback on audio devices throughout the environment. When a device wants to make use of a service that has a leader, the device may contact the device that is the leader for that service. For example, a device that wants to know the current occupancy state of the environment may access the service for occupancy state on the device that was elected leader for occupancy state. A device that generates data that may be used by a service that has a leader device may send that data to the leader device. For example, a sensor device that generates data related to the occupancy of the environment may send that data to the leader device for determining the occupancy state of the environment.

A leader device may be chosen for any service. For example, a leader device may be chosen to determine which device with a microphone has priority for responding to voice commands when there are multiple devices capable of responding to voice commands in the environment. The identity of the devices that are leaders may be distributed to the devices in the environment through spanning-tree communications or through broadcast communications between the devices. New elections may be held when, for example, a device that is a leader for a service is shut down or removed from the environment, in order to elect a new leader for that service. The devices in the environment may perform liveness checks in any suitable manner to determine when a device goes offline, for example, has been shut down, removed from the environment, or is otherwise no longer live and in communication with the other devices in the environment. A leader device may maintain a home directory that may list all of the devices currently available in the environment, and a list of devices that are supposed to be available in the environment. The lists may differ when, for example, a liveness check determines that a device has gone offline. Communication between devices to hold elections and distribute the identity of devices elected as the leaders for services may be conducted through the versions of the ambient computing library stored on the devices.

The devices, through the ambient computing library, may create, advertise, and use services. The services may be actions that a device may be capable of, including computations using specialized algorithms and special purpose computing hardware, control of hardware and software, and interaction with the environment, and resources that a device may provide, such as computational resources, playing back of sound, displaying of video, and recording of video or audio. The ambient computing library may allow for inputs, outputs, and computational resources of devices to be shared across devices in the environment as services made available through the ambient computing library. Devices may be able to use the computational resources of other devices in the environment to enable features that require more computational resources than are available on a single device. Computational resources may include general purpose processors, special purpose processors, volatile and non-volatile storage for data, and any other suitable computational resource. An environment may include a number of heterogenous and special purpose devices, through the ambient computing library the special purpose devices may be able to share their capabilities with other devices.

For example, an environment may have a number of cameras of varying types, each running a version of the ambient computing library. One of the cameras may be able to perform on-device facial recognition, either through special purpose processors or through general purpose processors, while the other cameras may not be able to perform on-device facial recognition, for example, due to having general purpose processors that are not powerful enough to run facial recognition algorithms fast enough to be practical. The camera that can perform on-device facial recognition may create and advertise this service using the ambient computing library. The other cameras may use the service to perform facial recognition, for example, sending images to the camera that can perform on-device facial recognition. The results of facial recognition performed through this service may be sent back to the camera that used the service, or may be sent to any other suitable device in the environment to be used in any suitable manner, such as, for example, for occupancy state determinations.

Devices with displays may create and advertise services that allow other devices, including devices that do not have displays, to use the displays, for example, sending images to be displayed. Similarity, devices with speakers may create and advertise services that allow other devices to send audio to be played back on the speakers. Devices with microphones may create and advertise services that allow other devices to both request that the microphone be used to record audio and to receive the recorded audio.

Services may also be used to control devices in the environment, such as locks that can be locked and unlocked, sensors that can be armed and disarmed, light switches, and HVAC systems. For example, a leader device may be elected to control the temperature of the environment. The leader device for controlling temperature may receive data used to determine an appropriate temperature for the environment, such as temperature data from devices in the environment with temperature sensors and occupancy state determinations from a leader device for determining the occupancy state of the environment. The leader device may then use services of devices that are part of the HVAC system, such as thermostats and vent controls, in order to adjust the temperature of the environment.

A manifest of services made available by devices in the environment may be maintained by a server. The server may be, for example, an external server, such as a server of a cloud computing system on which a non-guest occupant of the environment has an account. The server may run a portion of the ambient computing library to allow the server to interact with the devices through the ambient computing library. A device that wants to make a service available in the environment may send a request for authentication to the server. The server may evaluate the device to ensure that the device is located in the environment, has the hardware resources that are needed to perform any services that device wants to make available, and that the device is one that the server is willing to receive data from. When the server authenticates and authorizes the device to offer services, the server may add the device and services to the manifest. The server may cryptographically sign the manifest using a private key of the server so that the signature, and the manifest, may be authenticated using a public key of the server. The manifest may be sent to the devices in the environment, where it may be used by the ambient computing library on the devices to determine what services are available and how those services may be accessed. This may allow devices in the environment to create and advertise services to other devices in the environment. The server may also be responsible for tracking a status of the devices in the environment so that the status of the devices may be checked from outside the environment, and may help a user checking the status of the devices to determine if the environment has lost power or network connectivity when the devices themselves cannot be communicated with from outside the environment. The server may also make changes to devices, control devices, and update devices with the manifest and status of other devices when devices come back from being offline. The manifest may be stored as part of the home directory on the devices in the environment. In some implementations, the server may authenticate and authorize devices offer to services, but may not authorize the specific services or add those services to the manifest. Instead, the server may send an indication of its authorization of a device back to the device, provisioning a certificate for the device that may indicate that the device has been authenticated and authorized by the server. The device may update the home directory with data for the device, and may also update the manifest, which may be stored as part of the home directory, to add services offered by the device. The updated home directory, and updated manifest, may be distributed from the newly authorized device to other devices in the environment through any suitable form of communications, such as broadcast communications or spanning tree communications. The other devices in the environment may trust the home directory and manifest distributed by the device based on the certificate provisioned for the device by the server.

New devices may be added to the environment. The new devices may also store versions of the ambient computing library. When a new device is added to the environment, the device may be added to the list of available devices in the home directory. The new device may be assigned an access level that may control which of the services made available by the other devices in the environment the new device is allowed to access. For example, a new device may not be given access to services that may include sensitive data or control of sensitive systems and devices, such as security devices, of the environment. The access level may also determine which services offered by the new device may be used by other devices in the environment. For example, the new device may include a microphone, and may be able to recognize and respond to voice commands. The access level for the new device may be set to low, which may prevent the new device from being a leader device for responding to voice commands. This may, for example, prevent a device belonging to a guest of the environment, such as a phone carried into the environment by the guest, from becoming a leader device for responding to voice commands issued in the environment in place of devices that spend more time in the environment and belong to non-guest occupants of the environment, such as phones belonging to the non-guest occupants or speakers with microphones placed in the environment by non-guest occupants. The access level for a new device may be determined by, for example, the leader device responsible for the home directory, through voting by the devices already in the environment, through sending a request to a device, such as a phone, associated with a non-guest occupant of the environment, or in any other suitable manner.

New devices that offer services that may involve sensitive data, such as video or audio recorded within the environment, may need additional approval to offer the service. For example, a new device that is capable of on-device speech recognition may register this service when it connects to the network that connects the other devices in the environment. This service may involve other devices within the environment sending recorded audio to the new device, which may then perform on-device speech recognition on the recorded audio. Audio recordings taken with the environment may be considered to be sensitive data, so to be allowed to perform on-device speech recognition within the environment, the new device may need to be authenticated to an external server system, for example, a server of a cloud computing system on which a non-guest occupant of the environment has an account. A request may be sent to a device, such as a phone, associated with the non-guest occupant. The non-guest occupant may use their device to choose whether to authenticate the new device to the external server system, for example, using their account credentials. If the non-guest occupant approves the request to authenticate the new device, the new device may be given an access level that may allow it to provide the on-device speech recognition service to the other devices in the environment, including receiving audio recorded by those other devices.

The ambient computing library may also allow for a voice command system, for example, a voice assistant, to be used to access and control the devices in the environment. The voice command system may run on a device in the environment that includes a microphone, such as a speaker device, and may incorporate the ambient computing library. This may allow the voice command system to understand the devices that are available in the environment and the services offered by the devices as listed in the manifest, and to accomplish tasks based on voice commands using those devices and the services they offer. For example, a user in the environment may issue a voice command requesting the current occupancy state of the environment. The voice command system may, using the manifest and the ambient computing library, determine which device in the environment is the leader for determining occupancy state, and access the occupancy state service made available by that device in order to obtain the occupancy state and relay it back to the user, for example, through a display or speakers of the device running the voice command system or through another device in the environment.

FIG. 1 shows an example system and arrangement suitable for distributed ambient computing within an environment according to an implementation of the disclosed subject matter. An environment 150 may include devices 100, 110, 120, 130, and 140. The environment 150 may be any suitable environment or structure, such as, for example, a house, office, apartment, or other building, or area with any suitable combination of indoor and outdoor spaces. The device 100 may be sensor device that may include a camera 102 and computing hardware 105. The device 110 may be a sensor device that may include a passive infrared (PIR) sensor 112 and computing hardware 115. The device 120 may be a speaker device that may include speakers 122, a microphone 123, and computing hardware 125. The device 130 may be a control device that may include a display 132 and computing hardware 135. The device 140 may be a mobile computing device, such as a phone, that may include a display 142, speakers 143, a microphone 144, and computing hardware 145.

The computing hardware 105, 115, 125, 135, and 145 may be any suitable hardware for general purpose computing, including processors, network communications devices, special purpose computing, including special purposes processors and field programmable gate arrays, and storages 107, 117, 127, 137, and 147 that may include volatile and non-volatile storage. The computing hardware 105, 115, 125, 135, and 145 may vary across the devices 100, 110, 120, 130, and 140, for example, including different processors and different amounts and types of volatile and non-volatile storage, and may run different operating systems. The computing hardware 105, 115, 125, 135, and 145 may be any suitable computing device or system, such as, for example, a computer 20 as described in FIG. 11. The storages 107, 117, 127, 137, and 147 may respectively store the libraries 109, 119, 129, 139, and 149, which may be versions of the same ambient computing library customized to run on the computing hardware and operating system of the device on which the version of the ambient computing library is stored. For example, the library 109 may be a version of the ambient computing library customized to run on the computing hardware 105 and the operating system being run on the computing hardware 105, while the library 149 may be a version of the ambient computing library customized to run on the computing hardware 145 and the operating system running on the computing hardware 145, which may be different from the operating system running on the computing hardware 105. The libraries 109, 119, 129, 139, and 149 may enable communication between the devices 100, 110, 120, 130, and 140 in the environment 150 through any suitable local area network, and may allow the devices 100, 110, 120, 130, and 140 to make services available to each other and to hold elections.

The device 100 may send an authentication request to a server 190. The server 190 may be a server external to the environment 150, for example, a server of a cloud computing system. The server 190 may run parts of the ambient computing library, which may allow communication between the server 190 and the libraries 109, 119, 129, 139, and 149. A user in the environment 150, for example, a non-guest occupant, may have an account on the server 190. The server 190 may receive the authentication request from the device 100 and process the authentication request with a device authenticator 192. The device authenticator 192 may determine if the device 100 is located in the environment 150, if the device 100 has the hardware resources that are needed to perform any services that device 100 wants to make available, and if the device 100 is one that the server 190 is willing to receive data from. If the device authenticator 192 determines that the device 100 is located in the environment 150, can perform the services that the device 100 would like to advertise, and can be trusted by the server 190, the device 100 and the services it wants to advertise may be added to a manifest by a manifest generator 194. The server 190 may cryptographically sign the manifest using a private key of the server so that the signature, and the manifest, may be authenticated using a public key of the server. The manifest may be sent to the devices 100, 110, 120, 130, and 140 in the environment 150, and may be stored as manifest 108 in the storages 107, 117, 127, 137, and 147. The copies of the manifest 108 stored on the devices 100, 110, 120, 130, and 140 may be the same, so that every device in the environment 150 is aware of every other device in the environment 150 and the services offered by those devices. The ambient computing libraries, for example, libraries 109, 119, 129, 139, and 149, stored on the devices 100, 110, 120, 130, and 140 may use the manifest 108 to determine what services are available and how those services may be accessed. In some implementations, the server 190 may only authenticate the device 100, and may send an a message, which may be cryptographically signed, the device 100, and may provision a certificate for the device 100, indicating that the device 100 has been authorized to offer services within the environment 150. The device 100 may update the home directory to list the device 100, and may update the manifest 108, which may be stored as part of the home directory, with the services offered by the device 100. The updated home directory and manifest 108 may be distributed to other devices in the environment 150 through broadcast or spanning tree communications. The other devices, for example, the device 110, 120, 130, and 140, may determine whether they can trust the updated home directory and manifest 108 from the device 100 based on the certificate provisioned for the device 100 by the server 190.

The storages 107, 117, 127, 137, and 147 may also store a home directory in addition to a copy of the manifest 108. The home directory may, for example, include a listing of all of the devices that should be available in the environment 150 and an indication of which of those devices are actually available, as determined, for example, through liveness checks. The home directory may also include a listing of the identities of the devices that have been elected leaders for services that are listed in the manifest 108. Changes to the home directory may be communicated among devices within the environment 150 though, for example, spanning tree communications.

Figure 2A:
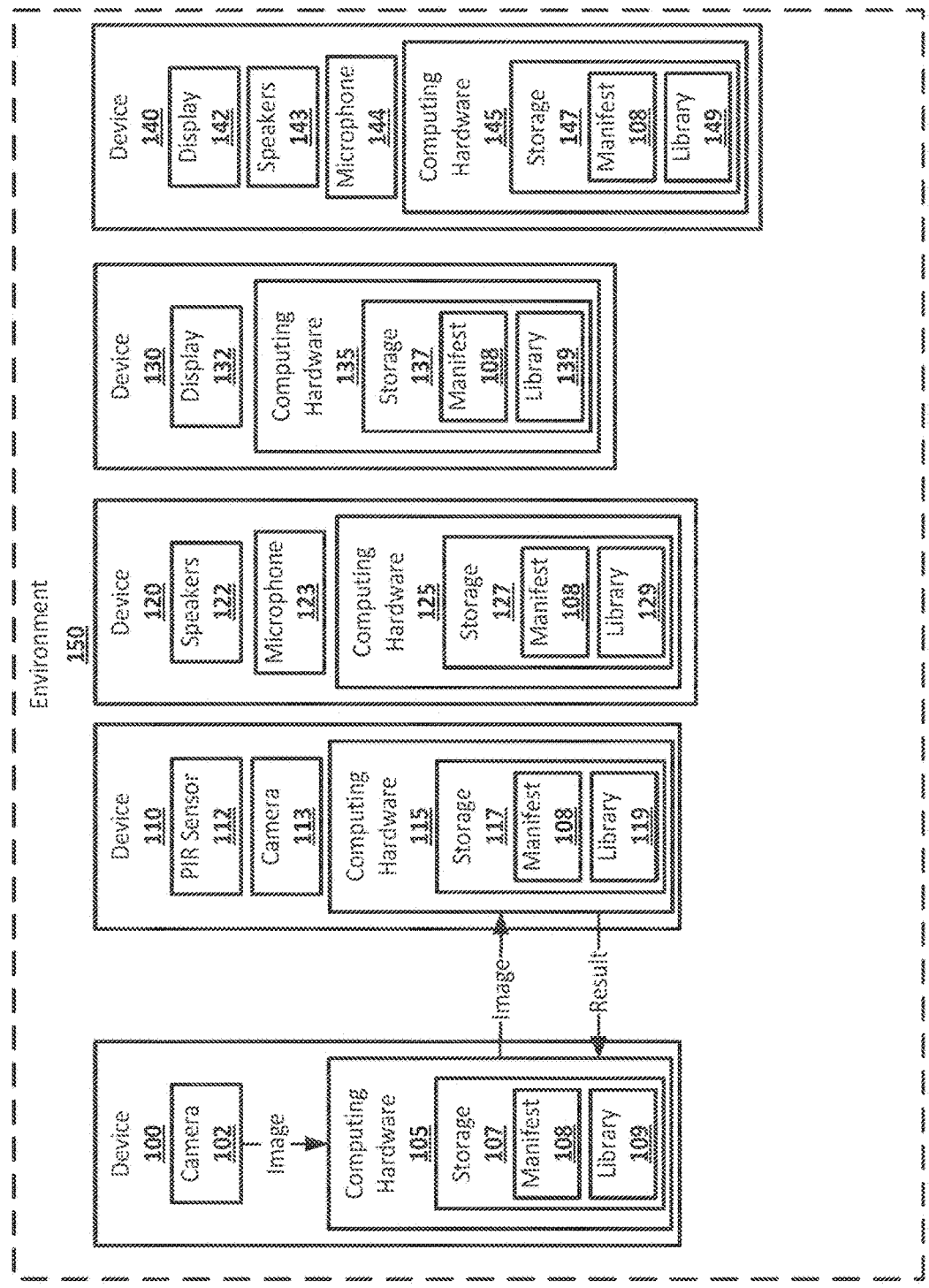
FIG. 2A shows an example system and arrangement suitable for distributed ambient computing within an environment according to an implementation of the disclosed subject matter.

FIG. 2A shows an example system and arrangement suitable for distributed ambient computing within an environment according to an implementation of the disclosed subject matter. The devices 100, 110, 120, 130, and 140 in the environment 150 may access services offered by one another, as listed in the manifest 108. For example, the device 100 may include the camera 102, which may be able to capture images and video, and the computing hardware 105, which may be able to process the captured images and video, but may not be able to perform facial recognition due to lack of appropriate computational resources. For example, the computing hardware 105 may include a general purpose processor which may not be powerful enough to perform facial recognition on images fast enough to be useful. When the device 100 captures an image using the camera 102, the device 100 may use the manifest 108 to determine that the device 110 offers a facial recognition service. The library 109, running on the computing hardware 105, may send the image from the camera 102 to the device 110 using network communications hardware of the computing hardware 105, accessing the facial recognition service of the device 110. The image may be received at the device 110 by the library 119 running on the computing hardware 115. The library 119 may initiate the performance of facial recognition on the image by the computing hardware 115. The results of facial recognition may be returned to the device 100, for example, via communication between the library 119 and the library 109 using their respective network communications hardware, and/or may be sent to any other device in the environment 150 to be used in any suitable manner.

Figure 2B:
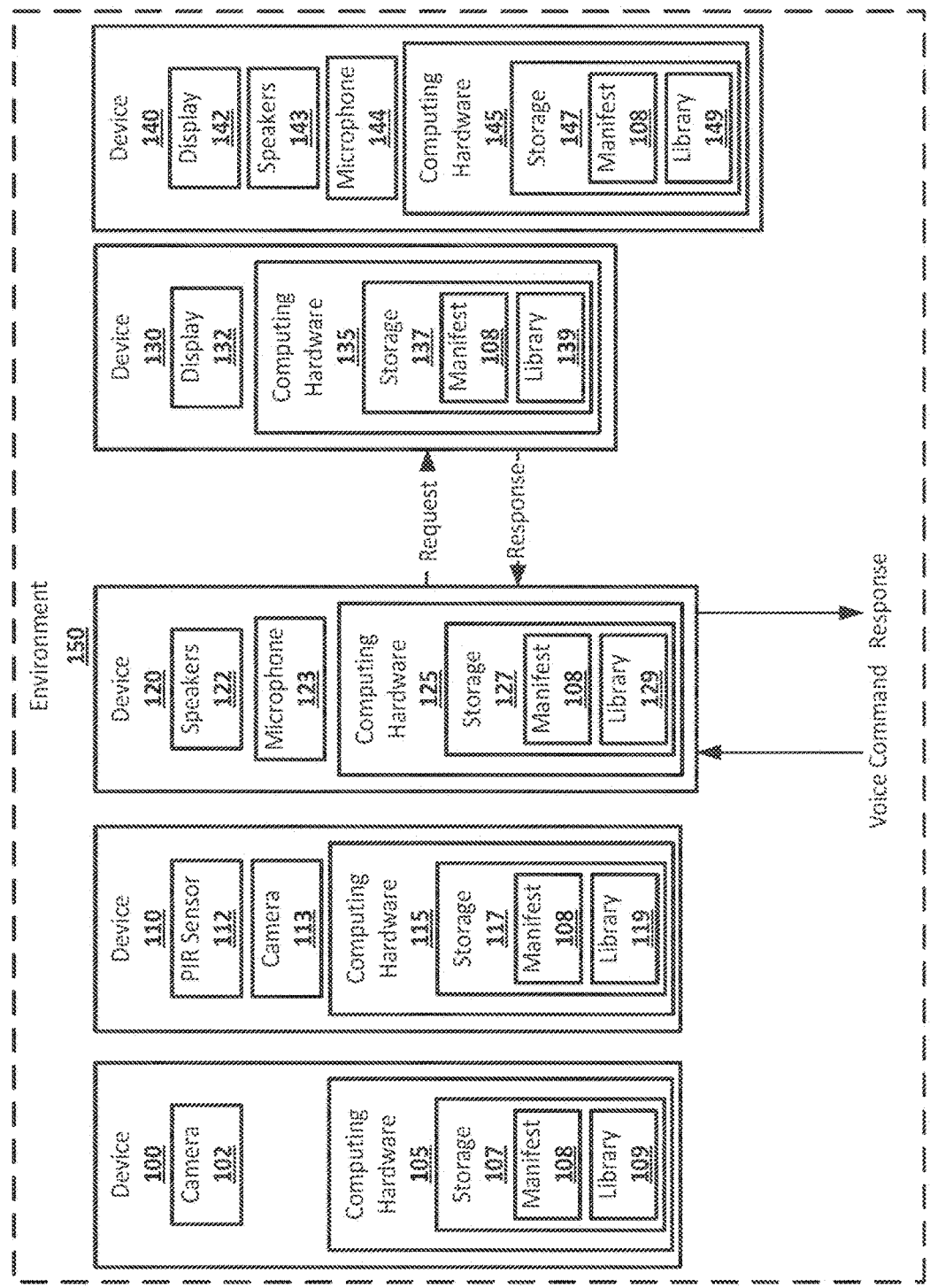
FIG. 2B shows an example environment suitable for distributed ambient computing within an environment according to an implementation of the disclosed subject matter.

FIG. 2B shows an example system and arrangement suitable for distributed ambient computing within an environment according to an implementation of the disclosed subject matter. A voice command may be spoken by a user in the environment 150. The device 120 and the device 140 may both have microphones and the ability to respond to voice commands. The device 120 may have been elected as the leader for voice command services, and may process the voice command received through the microphone 123. The device 120 may determine that the voice command requests that the device 120 provide data about the environment 150 that the device 120 is not able to provide on its own, such as, for example, the current occupancy state of the environment 150. The device 120 may use the manifest 108 to determine that that device 130 offers a service to provide the requested data, for example, the occupancy state of the environment, and may be the leader for that service. The request for the data may be sent to the device 130 by the library 129 running on the computing hardware 125 using the appropriate network communications hardware. The library 129 may call the service that provides the requested data offered by the device 130 through the library 139. The library 139, running on the computing hardware 135, may cause the computing hardware 135 to perform any necessary computation to obtain the requested data. The requested data may then be provided as response to the device 120 for example, via communication between the library 129 and the library 139 using their respective network communications hardware, or may be sent to any other device in the environment 150. For example, the device 120 may receive the requested data from the device 130 and then provide the requested data to the user in the environment 150 through the speakers 122, responding to the initial voice command from the user received at the device 120.

Figure 3:
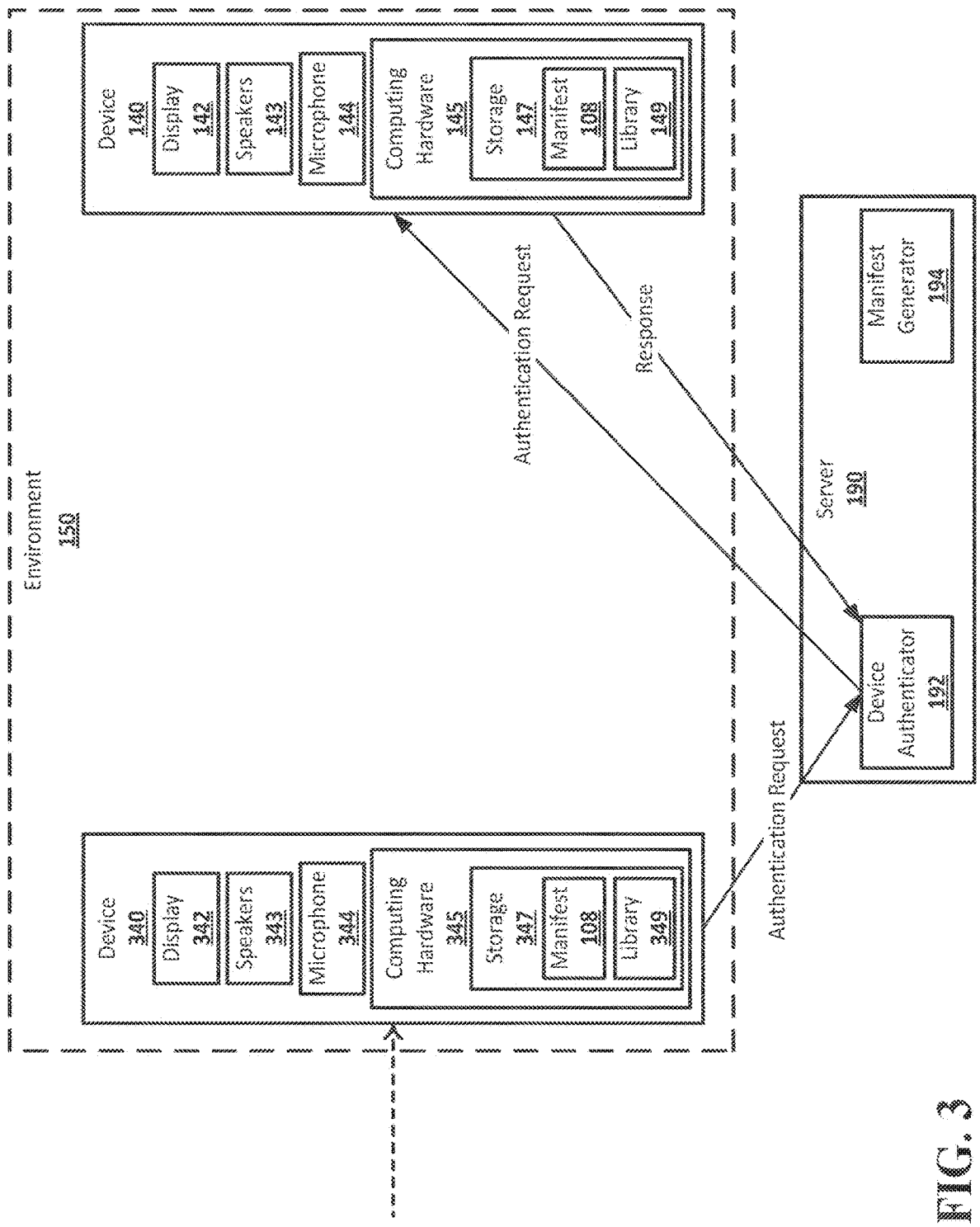
FIG. 3 shows an example environment suitable for distributed ambient computing within an environment according to an implementation of the disclosed subject matter.

FIG. 3 shows an example system and arrangement suitable for distributed ambient computing within an environment according to an implementation of the disclosed subject matter. A device 340 may be brought into the environment 150 from outside the environment 150. The device 340 may be a mobile computing device, such as a phone or tablet, that may be brought into the environment 150 by, for example, a guest of the environment 150. The device 340 may include a display 342, speakers 343, a microphone 344, computing hardware 345, and a storage 347 that may store a version of the ambient computing library as library 349. The device 340 may be capable of on-device speech recognition. The device 340 may need to authenticate itself with the server 190 and receive approval from a non-guest occupant of the environment 150 in order to offer an on-device speech recognition service within the environment 150, as performing on-device speech recognition within the environment 150 may involve sensitive data from other devices from within the environment 150. The server 190 may receive the authentication request from the device 340, and may forward the authentication request to the device 140, which may be a mobile computing device associated with a non-guest occupant of the environment 150 and may be signed-in to an account on the server 190. The device 140 may display the authentication request to a user of the device 140, who may be able to indicate whether the authentication request should be granted or denied. The response, either approving or denying the authentication request, may be sent back to the server 190.

If the authentication request is approved using the device 140, the device 340 may be allowed to offer on-device speech recognition as a service within the environment 150, which may allow other devices in the environment 150 to send recorded audio to the device 340 to have speech recognition performed. The on-device speech recognition offered by the device 340 may be added to the manifest by the manifest generator 194, which may then distribute the updated manifest to the devices in the environment 150. In some implementations, the server 190 may only authenticate the device 340, and may send an a message, which may be cryptographically signed, to the device 340 indicating that that the device 340 has been authorized to offer speech recognition within the environment 150, and provisioning a certificate for the device 340. The device 340 may update the home directory to list the device 340, and may update the manifest 108, which may be stored as part of the home directory, with the speech recognition service offered by the device 340. The updated home directory and manifest 108 may be distributed to other devices in the environment 150 through, for example, broadcast or spanning tree communications. The other devices in the environment 150 may use the certificate provisioned for the device 340 to determine whether to trust the updated home directory and manifest 108 from the device 340.

If the authentication request is denied using the device 140, the device 340 may not be allowed to offer on-device voice recognition as a service to the devices in the environment 150. The device 340 may be allowed to offer other services, for example, services that may involve data that is less sensitive than recorded audio. Having these services added to the manifest may not require approval from a non-guest occupant of the environment 150.

Figure 4:
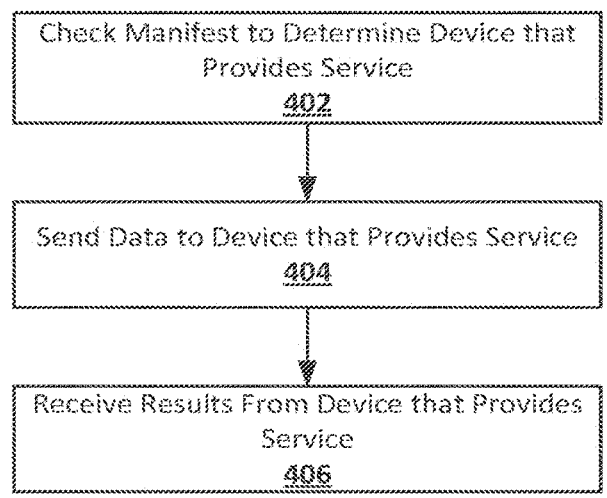
FIG. 4 shows an example process suitable for distributed ambient computing within an environment according to an implementation of the disclosed subject matter.

FIG. 4 shows an example of a process suitable for distributed ambient computing within an environment according to an implementation of the disclosed subject matter. At 402, a device may check a manifest to determine a device that provides a service. For example, the device 100 may check the manifest 108 to determine what devices in the environment 150 provide a service of performing facial recognition on images. The device 100 may, for example, determine that the device 110 offers the service of performing facial recognition on images. The manifest 108 may be checked by, for example, a procedure of the library 109 running on the computing hardware 105.

At 404, the device may send data to the device that provides the service. For example, the device 100 may send image data generated by the camera 102 to the device 110. Communication between the device 100 and the device 110 may be handled by the library 109 and the library 119, using the communications hardware that is part of the computing hardware 105 and the computing hardware 115.

At 406, the device may receive results from the device that provides the service. For example, the device 110 may perform facial recognition on the image on the received from the device 100. The results of the facial recognition may be sent from the device 110 to the device 100. The results may be sent, for example, from the library 119 to the library 109 using communications hardware that is part of the computing hardware 105 and the computing hardware 115. The device 100 may use the results of the facial recognition performed by the device 110 in any suitable manner. The results of the facial recognition performed by the device 110 may also be sent to any other suitable device within the environment 150, such as, for example, a device that is the leader for occupancy determination.

Figure 5:
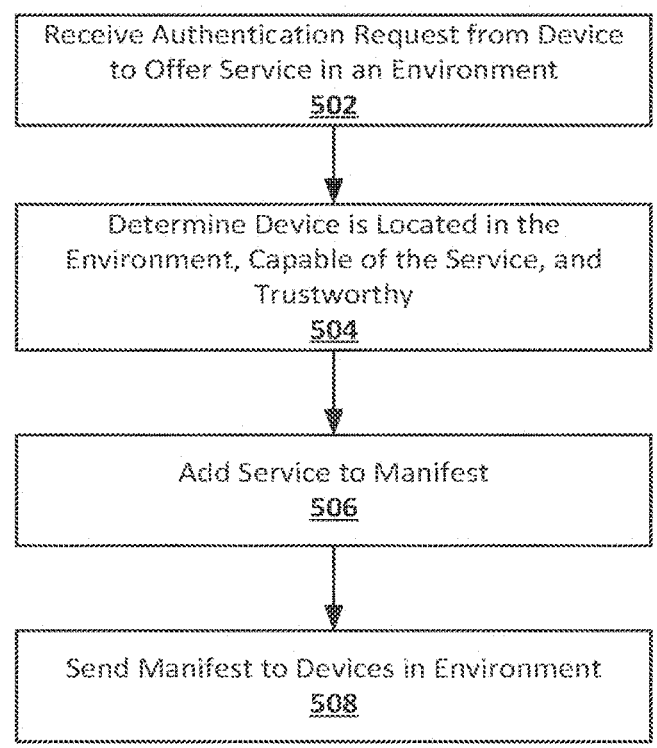
FIG. 5 shows an example process suitable for distributed ambient computing within an environment according to an implementation of the disclosed subject matter.

FIG. 5 shows an example of a process suitable for distributed ambient computing within an environment according to an implementation of the disclosed subject matter. At 502, an authentication request may be received from a device to offer a service in an environment. For example, the device 340 may send an authentication request to the server 190. The authentication request may be generated and sent by, for example, a procedure of the library 349 running on the computing hardware 345. The authentication request may include, for example, data about the services offered by the device 340, and data about the computing hardware 345 and other hardware, such as display 342, speakers 343, and microphone 344, on the device 340.

At 504 it may be determined that the device is located in the environment, capable of the service, and trustworthy. For example, the device authenticator 192 on the server 190 may determine that the device 340 is currently located in the environment 150, is capable of providing any services that the device 340 is offering to perform, and is trustworthy. The device authenticator 192 may use any suitable data in making determinations about the device 340, including data received from the device 340 as part of the authentication request.

At 506, the service may be added to the manifest. For example, the device authenticator 192 may have determined that the device 340 is currently located in the environment 150, is capable of performing services being offered by the device 304, and is trustworthy. The manifest generator 194 of the server 190 may add the device 340, and the services offered by the device 340, to the manifest used in the environment 150, for example, the manifest 108.

At 508, the manifest may be sent to the devices in the environment. For example, the server 190 may send the manifest, updated with the services offered by the device 340, to be stored on the devices in the environment 150. The manifest may be sent through any suitable network connection between the devices in the environment 150 and the server 190. The sever 190 may communicate with, for example, the libraries 109, 119, 129, 139, and 149, causing the devices 100, 110, 120, 130, and 140 to store a copy of the updated manifest 108 in their respective storages 107, 117, 127, 137, and 147.

Figure 6:
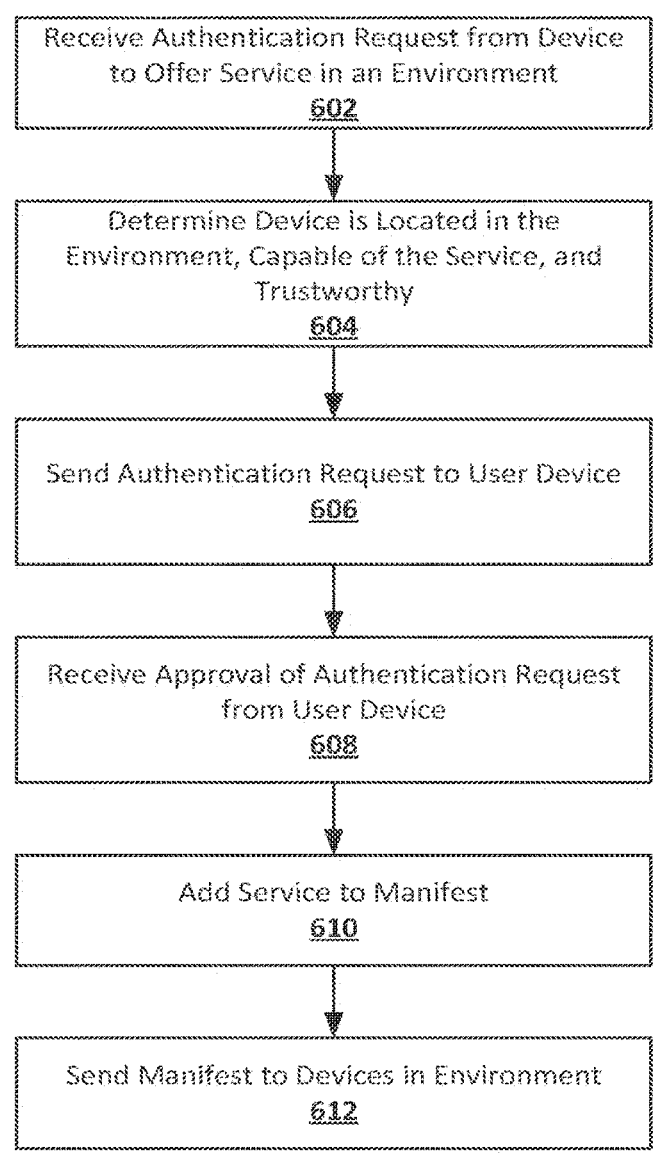
FIG. 6 shows an example process suitable for distributed ambient computing within an environment according to an implementation of the disclosed subject matter.

FIG. 6 shows an example of a process suitable for distributed ambient computing within an environment according to an implementation of the disclosed subject matter. At 602, an authentication request may be received from a device to offer a service in an environment. For example, the device 340 may send an authentication request to the server 190. The authentication request may be generated and sent by, for example, a procedure of the library 349 running on the computing hardware 345. The authentication request may include, for example, data about the services offered by the device 340, and data about the computing hardware 345 and other hardware, such as display 342, speakers 343, and microphone 344, on the device 340. A service being offered by the device 340 may involve sensitive data from within the environment 150. For example, the device 340 may offer a service of speech recognition that may be performed on audio recorded by devices within the environment 150.

At 604 it may be determined that the device is located in the environment, capable of the service, and trustworthy. For example, the device authenticator 192 on the server 190 may determine that the device 340 is currently located in the environment 150, is capable of providing any services that the device 340 is offering to perform, and is trustworthy. The device authenticator 192 may use any suitable data in making determinations about the device 340, including data received from the device 340 as part of the authentication request.

At 606, the authentication request may be sent to a device in the environment. For example, the device authenticator 192 may send the authentication request to a device already in the environment 150 that belongs to a non-guest occupant, such as the device 140, to have the non-guest occupant approve the authentication request. For example, approval from a device belonging to a non-guest occupant may be needed due to the device 340 offering a service that involves sensitive data from within the environment 150.

At 608, approval of the authentication request may be received from the user device. For example, a user of the device 140 may indicate, using the device 140, that they approve the authentication request from the device 340. The approval may be sent from the device 140 to the server 190, for example, using the library 149.

At 610, the service may be added to the manifest. For example, the device authenticator 192 may have determined that the device 340 is currently located in the environment 150, is capable of performing services being offered by the device 304, and is trustworthy. The manifest generator 194 of the server 190 may add the device 340, and the services offered by the device 340, to the manifest used in the environment 150, for example, the manifest 108. The device 340 may have been approved, for example, by a user of the device 140, to offer services that involve sensitive data from within the environment 150, and those services may be included on the manifest. If the device 340 had not received approval to offer services that involve sensitive data from within the environment 150, those services may not be added to the manifest, though other services offered by the device 340 that do not involve such sensitive data may be still be added to the manifest.

At 612, the manifest may be sent to the devices in the environment. For example, the server 190 may send the manifest, updated with the services offered by the device 340, to be stored on the devices in the environment 150. The manifest may be sent through any suitable network connection between the devices in the environment 150 and the server 190. The sever 190 may communicate with, for example, the libraries 109, 119, 129, 139, and 149, causing the devices 100, 110, 120, 130, and 140 to store a copy of the updated manifest 108 in their respective storages 107, 117, 127, 137, and 147.

Figure 7:
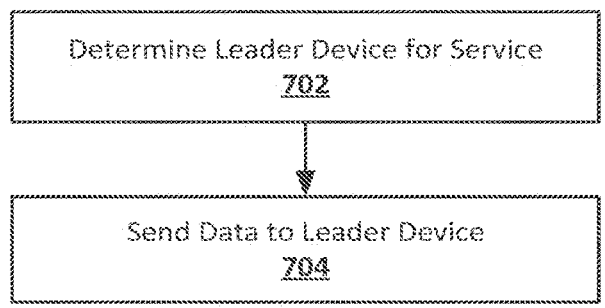
FIG. 7 shows an example process suitable for distributed ambient computing within an environment according to an implementation of the disclosed subject matter.

FIG. 7 shows an example of a process suitable for distributed ambient computing within an environment according to an implementation of the disclosed subject matter. At 702, a leader device for a service may be determined. For example, the devices in the environment 150, such as the devices 100, 110, 120, 130, and 140, may hold an election to determine the leader for a service. The service may be a service that is offered by any number of the devices in the environment 150. The election may be held in any suitable manner, and may, for example, be conducted through communication between the devices handled through the libraries 109, 119, 129, 139, and 149. The election may involve devices voting for the device that should be the leader for the service. A device may vote based on any suitable criteria. For example, if only one device offers the service that is the subject of the election, devices may vote to elect that device as the leader for the service. If multiple devices offer the service, devices may vote based on, for example, the relative power of the computing hardware of the devices that offer the service. An election to determine the leader for a service may be held at any suitable time, including, for example, when a device that was previously the leader for the service is no longer present in the environment 150 or has otherwise become unavailable. The identity of the device elected as the leader for a service may be added to a home directory that may be distributed among the devices in the environment 150 in any suitable manner. The home directory may be consulted by devices when the devices wish to determine which device is the leader for a particular service.

At 704, data may be sent to the leader device for the service. For example, the device 130 may be the leader for the service that determines the occupancy state of the environment 150. Data that may be used to determine the occupancy state of the environment generated by any of the other devices in the environment 150 may be sent to the device 130 by the other devices. The data may be sent as it is generated, at specified intervals, or when requested by the device 130. Audio recorded by the device 120 that includes a voice command requesting the current occupancy state of the environment 150 may result in a request for the occupancy state being sent to the device 130 from the device 120. The device 130 may use data it received as leader of the occupancy state service from other devices in the environment 150 to determine the current occupancy state of the environment 150 and send an appropriate response to the voice command to the device 120.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 8:
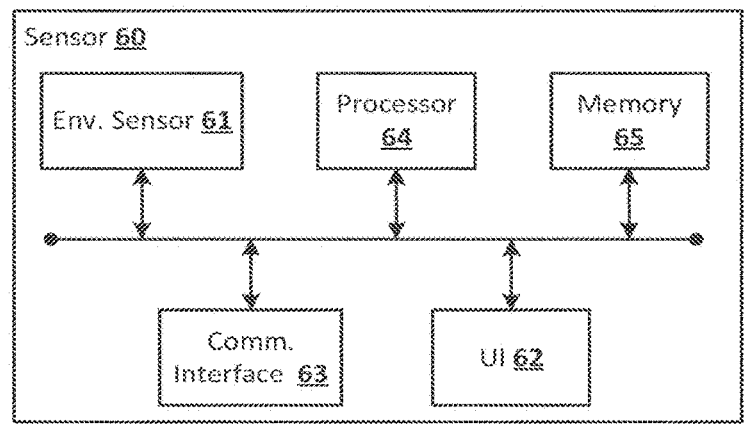
FIG. 8 shows a computing device according to an embodiment of the disclosed subject matter.

A sensor may include hardware in addition to the specific physical sensor that obtains information about the environment. FIG. 8 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 9:
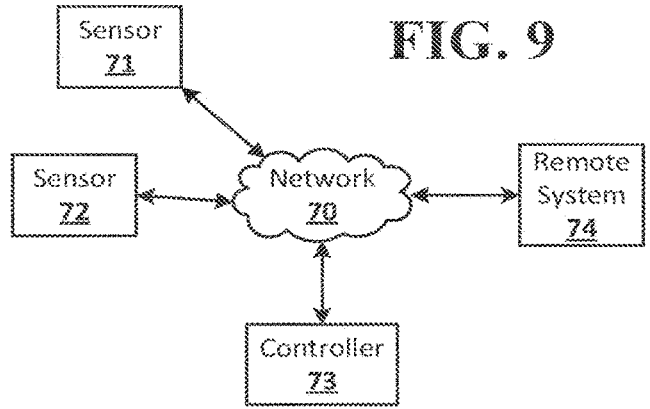
FIG. 9 shows a system according to an embodiment of the disclosed subject matter.

FIG. 9 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 155 may be an example of a controller 73 and the sensors 210 may be examples of sensors 71 and 72, as shown and described in further detail with respect to FIGS. 1-10.

The devices of the security system and home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the home environment may include wireless system-on-chips to support the low-power, secure, stable, and/or scalable communications network 70.

The sensor network shown in FIG. 9 may be an example of a home environment. The depicted home environment may include a structure, a house, office building, garage, mobile home, or the like. The devices of the environment, such as the sensors 71, 72, the controller 73, and the network 70 may be integrated into a home environment that does not include an entire structure, such as an apartment, condominium, or office space.

The environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like). One or more of the devices in the environment need not physically be within the structure. For example, the controller 73 which may receive input from the sensors 71, 72 may be located outside of the structure.

The structure of the home environment may include a plurality of rooms, separated at least partly from each other via walls. The walls can include interior walls or exterior walls. Each room can further include a floor and a ceiling. Devices of the home environment, such as the sensors 71, 72, may be mounted on, integrated with and/or supported by a wall, floor, or ceiling of the structure.

The home environment including the sensor network shown in FIG. 9 may include a plurality of devices, including intelligent, multi-sensing, network-connected devices that can integrate seamlessly with each other and/or with a central server or a cloud-computing system (e.g., controller 73 and/or remote system 74) to provide home-security and home features. The home environment may include one or more intelligent, multi-sensing, network-connected thermostats one or more intelligent, network-connected, multi-sensing hazard detection units and one or more intelligent, multi-sensing, network-connected entryway interface devices. The hazard detectors, thermostats, and doorbells may be the sensors 71, 72 shown in FIG. 9.

According to embodiments of the disclosed subject matter, the thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 9, and the controller 73 may control the HVAC system (not shown) of the structure.

A hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 9, and the controller 73 may control an alarm system to provide a visual and/or audible alarm to the user of the home environment.

A doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the home environment of the sensor network shown in FIG. 9 may include one or more intelligent, multi-sensing, network-connected wall switches, one or more intelligent, multi-sensing, network-connected wall plug. The wall switches and/or wall plugs may be the sensors 71, 72 shown in FIG. 9. The wall switches may detect ambient lighting conditions, and control a power and/or dim state of one or more lights. For example, the sensors 71, 72, may detect the ambient lighting conditions, and the controller 73 may control the power to one or more lights (not shown) in the home environment. The wall switches may also control a power state or speed of a fan, such as a ceiling fan. For example, sensors 72, 72 may detect the power and/or speed of a fan, and the controller 73 may adjusting the power and/or speed of the fan, accordingly. The wall plugs may control supply of power to one or more wall plugs (e.g., such that power is not supplied to the plug if nobody is detected to be within the home environment). For example, one of the wall plugs may controls supply of power to a lamp (not shown).

In embodiments of the disclosed subject matter, the home environment may include one or more intelligent, multi-sensing, network-connected entry detectors. The sensors 71, 72 shown in FIG. 9 may be the entry detectors. The illustrated entry detectors (e.g., sensors 71, 72) may be disposed at one or more windows, doors, and other entry points of the home environment for detecting when a window, door, or other entry point is opened, broken, breached, and/or compromised. The entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all entry detectors (e.g., sensors 71, 72) indicate that all doors, windows, entryways, and the like are closed and/or that all entry detectors are armed.

The home environment of the sensor network shown in FIG. 9 can include one or more intelligent, multi-sensing, network-connected doorknobs. For example, the sensors 71, 72 may be coupled to a doorknob of a door (e.g., doorknobs 122 located on external doors of the structure of the home environment). However, it should be appreciated that doorknobs can be provided on external and/or internal doors of the home environment.

The thermostats, the hazard detectors, the doorbells, the wall switches, the wall plugs, the entry detectors, the doorknobs, the keypads, and other devices of the home environment (e.g., as illustrated as sensors 71, 72 of FIG. 9 can be communicatively coupled to each other via the network 70, and to the controller 73 and/or remote system 74 to provide security, safety, and/or comfort for the environment).

A user can interact with one or more of the network-connected devices (e.g., via the network 70). For example, a user can communicate with one or more of the network-connected devices using a computer (e.g., a desktop computer, laptop computer, tablet, or the like) or other portable electronic device (e.g., a phone, a tablet, a key FOB, and the like). A webpage or application can be configured to receive communications from the user and control the one or more of the network-connected devices based on the communications and/or to present information about the device's operation to the user. For example, the user can view can arm or disarm the security system of the home.

One or more users can control one or more of the network-connected devices in the home environment using a network-connected computer or portable electronic device. In some examples, some or all of the users (e.g., individuals who live in the home) can register their mobile device and/or key FOBs with the home environment (e.g., with the controller 73). Such registration can be made at a central server (e.g., the controller 73 and/or the remote system 74) to authenticate the user and/or the electronic device as being associated with the home environment, and to provide permission to the user to use the electronic device to control the network-connected devices and the security system of the home environment. A user can use their registered electronic device to remotely control the network-connected devices and security system of the home environment, such as when the occupant is at work or on vacation. The user may also use their registered electronic device to control the network-connected devices when the user is located inside the home environment.

Alternatively, or in addition to registering electronic devices, the home environment may make inferences about which individuals live in the home and are therefore users and which electronic devices are associated with those individuals. As such, the home environment "learns" who is a user (e.g., an authorized user) and permits the electronic devices associated with those individuals to control the network-connected devices of the home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The home environment may include communication with devices outside of the home environment but within a proximate geographical range of the home. For example, the home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected devices in the home environment. For example, in the event, any of the network-connected devices, such as wall plugs located outdoors, detect movement at night time, the controller 73 and/or remote system 74 can activate the outdoor lighting system and/or other lights in the home environment.

Figure 12:
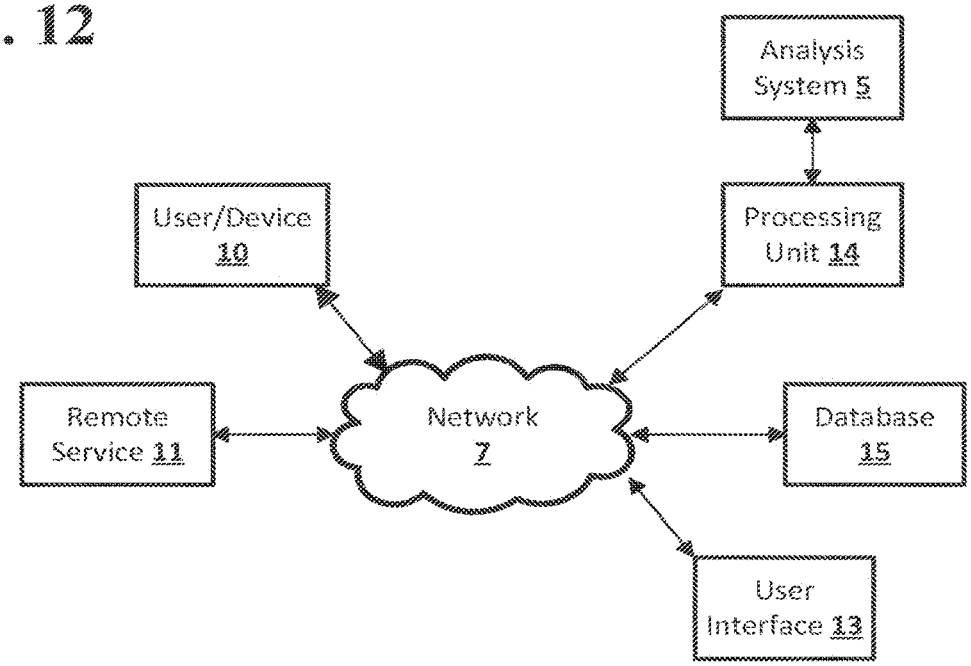
FIG. 12 shows a network configuration according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 12 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 11:
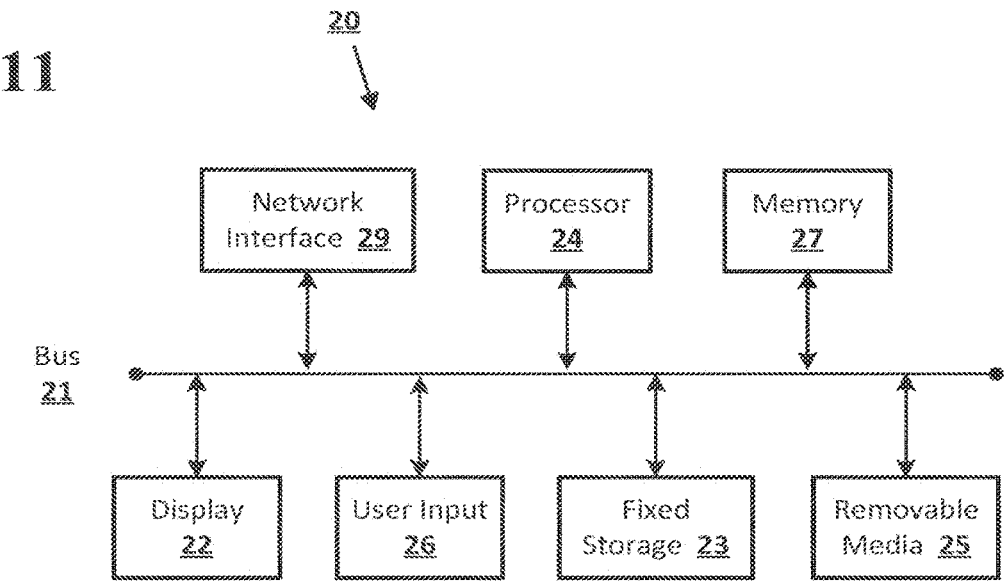
FIG. 11 shows a computer according to an embodiment of the disclosed subject matter.

Embodiments of the presently disclosed subject matter may be implemented in and used with a variety of computing devices. FIG. 11 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(®), near-field, and the like. For example, the network interface 29 may allow the device to communicate with other computers via one or more local, wide-area, or other communication networks, as described in further detail herein.

Figure 10:
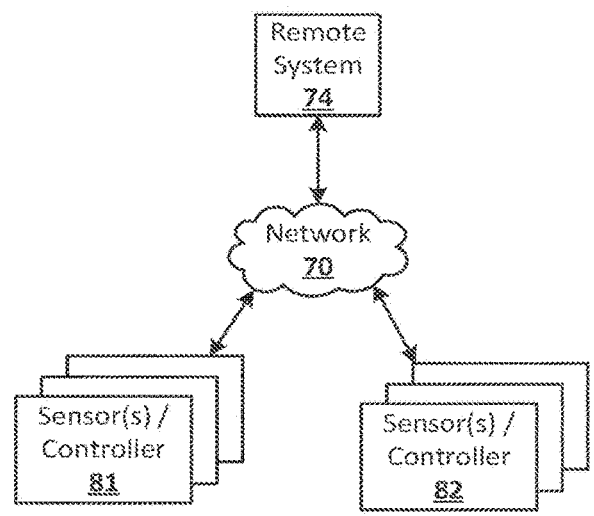
FIG. 10 shows a system according to an embodiment of the disclosed subject matter.

FIG. 10 shows an example network arrangement according to an embodiment of the disclosed subject matter. One or more clients 10, 11, such as local computers, phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

A first version of an ambient computing library running on a device may check a manifest in the storage of the device to identify a second device that provides a service. The first version of the ambient computing library running on the device may send data to be processed using the service provided by the second device to the second device through a second version of the ambient computing library running on the second device. The first device and the second device may include different computing hardware. The first version of the ambient computing library running on the device may receive data including results from the second device through the second version of the ambient computing library. The data including the results may be generated by the second device based on processing, with the service provided by the second device using computing hardware of the second device, the data sent from the device by the first version of the ambient computing library.

The first version of the ambient computing library running on the device may determine a leader device for a second service. The second data stored on the device is of a type used by the second service. The first version of the ambient computing library running on the device may send the second data to the leader device for the second service.

The leader device for the second service may be listed in a home directory stored on the device.

The first version of the ambient computing library running on the device may vote in an election for a leader device.

The first version of the ambient computing library running on the device may send an authorization request to a server. The authorization request may include a request by the device to create and offer a third service to other devices in an environment with the device. An updated manifest including a listing of the third service may be received from the server.

The first version of the ambient computing library running on the device from a third version of the ambient computing library running on a third device may receive second data to be processed using the third service provided by the device. The second data may be processed with the third service provided by the device to generate third data including results of processing the second data. The first version of the ambient computing library running on the device may send the third data comprising results to devices in an environment with the device through versions of the ambient computing library on the devices.

The device and the second device may be located in an environment and communicate through a local area network.

A system may include a storage including a manifest and computing hardware including a processor that checks, using a first version of an ambient computing library the manifest in the storage to determine a device that provides a service, sends, using the first version of the ambient computing library, data to be processed using the service provided by the device to the device through a second version of the ambient computing library running on the device, wherein the device comprise different computing hardware than the computing hardware, and receives, using the first version of the ambient computing library, data comprising results from the device through the second version of the ambient computing library, wherein the data comprising the results is generated by the device based on processing, with the service provided by the device using computing hardware of the device, the data sent to the device using the first version of the ambient computing library.

The processor may further determine, using the first version of the ambient computing library, a leader device for a second service, wherein second data stored on the device is of a type used by the second service, send, using the first version of the ambient computing library, the second data to the leader device for the second service.

The processor may further vote, using the first version of the ambient computing library, in an election for a leader device.

The processor may further send, using the first version of the ambient computing library, an authorization request to a server, the authorization request comprising a request to create and offer a third service to other devices in an environment, and receive, from the server, an updated manifest comprising a listing of the third service.

The processor may further receive, using the first version of the ambient computing library from a third version of the ambient computing library running on a second device, second data to be processed using the third service, process the second data with the third service to generate third data comprising results of processing the second data, and send, using the first version of the ambient computing library running, the third data comprising results to one or more devices in an environment through versions of the ambient computing library on the one or more devices.

According to an embodiment of the disclosed subject matter, a means for checking, by a first version of an ambient computing library running on a device, a manifest in the storage of the device to identify a second device that provides a service, a means for sending, by the first version of the ambient computing library running on the device, data to be processed using the service provided by the second device to the second device through a second version of the ambient computing library running on the second device, wherein the first device and the second device comprise different computing hardware, a means for receiving, by the first version of the ambient computing library running on the device, data including results from the second device through the second version of the ambient computing library, wherein the data including the results is generated by the second device based on processing, with the service provided by the second device using computing hardware of the second device, the data sent from the device by the first version of the ambient computing library, a means for determining, by the first version of the ambient computing library running on the device, a leader device for a second service, wherein second data stored on the device is of a type used by the second service, a means for sending, by the first version of the ambient computing library running on the device, the second data to the leader device for the second service, a means for voting, by the first version of the ambient computing library running on the device, in an election for a leader device, a means for sending, by the first version of the ambient computing library running on the device, an authorization request to a server, the authorization request including a request by the device to create and offer a third service to other devices in an environment with the device, a means for receiving, from the server, an updated manifest including a listing of the third service, a means for receiving, by the first version of the ambient computing library running on the device from a third version of the ambient computing library running on a third device, second data to be processed using the third service provided by the device, a means for processing the second data with the third service provided by the device to generate third data including results of processing the second data, and a means for sending, by the first version of the ambient computing library running on the device, the third data including results to devices in an environment with the device through versions of the ambient computing library on the devices, are provided.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
   identifying, by a first device through checking in a storage associated with the first device, a second device that provides a service;
   voting by the first device and in an election for a leader device, the voting based on computing hardware capabilities for a respective leader for a respective service of the respective leader sufficient to perform the respective service;
   identifying, by the first device, the second device as the leader device for the service;
   sending, from the first device, data to the second device to be processed using the service provided by the second device; and
   receiving, at the first device, data including results from the second device, the results based on processing, with the service provided by the second device using computing hardware of the second device, the data sent from the first device.

2. The method of claim 1, further comprising:
   determining, by the first device, the leader device for a second service, wherein second data stored on the first device is of a type used by the second service; and
   sending, by the first device, the second data to the leader device for the second service.

3. The method of claim 2, wherein the leader device for the second service is listed in a home directory stored on the first device.

4. The method of claim 1, further comprising:
   sending, by the first device, an authorization request to a server, the authorization request comprising a request by the first device to create and offer a third service to other devices in an environment with the first device; and
   receiving, from the server, an updated listing of devices for the third service.

5. The method of claim 4, further comprising:
   receiving, by the first device from a third device, second data to be processed using the third service provided by the first device;
   processing the second data with the third service provided by the first device to generate third data comprising results of processing the second data; and sending, by the first device, the third data comprising results to one or more devices in an environment with the first device.

6. The method of claim 1, wherein the first device and the second device are located in an environment and communicate through a local area network.

7. The method of claim 1, wherein identifying the second device that provides the service is identified using an ambient computing library running on the first device, and wherein:
sending data from the first device is sent by the ambient computing library running on the first device; and
receiving data from the second device is received by the ambient computing library on the first device.

8. The method of claim 1, wherein the first device and the second device have different computing hardware capabilities.

9. The method of claim 1, wherein the respective leader for the respective service is also elected based on software capabilities of the second device.

10. The method of claim 1, further comprising:
sending, by the first device, data to the leader device, the data including results from the election of the leader device.

11. One or more non-transitory computer readable storage devices storing instructions that are operable, when executed by one or more computers, to cause the one or more computers to perform operations comprising:
identifying, by a first device through checking in a storage associated with the first device, a second device that provides a service;
voting by the first device and in an election for a leader device, the voting based on computing hardware capabilities for a respective leader for a respective service of the respective leader sufficient to perform the respective service;
identifying, by the first device, the second device as the leader device for the service;
sending, from the first device, data to the second device to be processed using the service provided by the second device; and
receiving, at the first device, data including results from the second device, the results based on processing, with the service provided by the second device using computing hardware of the second device, the data sent from the first device.

12. The one or more non-transitory computer readable storage devices of claim 11, wherein the instructions further cause the one or more computers to perform operations comprising:
determining, by the first device, the leader device for a second service, wherein second data stored on the first device is of a type used by the second service; and
sending, by the first device, the second data to the leader device for the second service.

13. The one or more non-transitory computer readable storage devices of claim 12, wherein the leader device for the second service is listed in a home directory stored on the first device.

14. The one or more non-transitory computer readable storage devices of claim 11, wherein the instructions further cause the one or more computers to perform operations comprising:
sending, by the first device, an authorization request to a server, the authorization request comprising a request by the first device to create and offer a third service to other devices in an environment with the first device; and
receiving, from the server, an updated listing of devices for the third service.

15. The one or more non-transitory computer readable storage devices of claim 14, wherein the instructions further cause the one or more computers to perform operations comprising:
receiving, by the first device from a third device, second data to be processed using the third service provided by the first device;
processing the second data with the third service provided by the first device to generate third data comprising results of processing the second data; and
sending, by the first device, the third data comprising results to one or more devices in an environment with the first device.

16. The one or more non-transitory computer readable storage devices of claim 11, wherein the first device and the second device are located in an environment and communicate through a local area network.

17. The one or more non-transitory computer readable storage devices of claim 11, wherein identifying the second device that provides the service is identified using an ambient computing library running on the first device, and wherein:
sending data from the first device is sent by the ambient computing library running on the first device; and
receiving data from the second device is received by the ambient computing library on the first device.

18. The one or more non-transitory computer readable storage devices of claim 11, wherein the first device comprises a mobile computing device and the second device comprises a desktop computer.

19. The one or more non-transitory computer readable storage devices of claim 18, wherein identifying, by the first device, the second device as leader for the service identifies the second device from a group of two or more devices.

20. The one or more non-transitory computer readable storage devices of claim 11, wherein the first device and the second device have different computing hardware capabilities.

21. The one or more non-transitory computer readable storage devices of claim 11, wherein the respective leader for the respective service is also elected based on software capabilities of the second device.

22. The one or more non-transitory computer readable storage devices of claim 11, wherein the instructions further cause the one or more computers to perform operations comprising:
sending, by the first device, data to the leader device, the data including results from the election of the leader device.

* * * * *